United States Patent
Hsu et al.

(10) Patent No.: US 8,235,572 B2
(45) Date of Patent: Aug. 7, 2012

(54) BACKLIGHT MODULE

(75) Inventors: Ching-Hsiu Hsu, Zhongli (TW); Chin-Young Lin, Taoyuan (TW)

(73) Assignee: Chunghwa Picture Tubes., Ltd., Taoyuan (TW)

( * ) Notice: Subject to any disclaimer, the term of this patent is extended or adjusted under 35 U.S.C. 154(b) by 494 days.

(21) Appl. No.: 12/640,800

(22) Filed: Dec. 17, 2009

(65) Prior Publication Data

US 2011/0075397 A1  Mar. 31, 2011

(30) Foreign Application Priority Data

Sep. 25, 2009 (TW) .............................. 98132521 A (51) Int. Cl.
*F21V 7/04* (2006.01)
(52) U.S. Cl. ........ 362/607; 362/600; 362/609; 362/612; 362/627; 349/58; 349/65
(58) Field of Classification Search ................ 362/612, 362/600, 606, 609, 627; 349/58, 65, 67
See application file for complete search history.

(56) References Cited

U.S. PATENT DOCUMENTS

| | | | | |
|---|---|---|---|---|
| 5,742,366 | A * | 4/1998 | Imoto | 349/62 |
| 6,742,907 | B2 * | 6/2004 | Funamoto et al. | 362/625 |
| 7,083,317 | B2 * | 8/2006 | Higashiyama | 362/612 |
| 7,160,019 | B1 * | 1/2007 | Kawakami | 362/632 |
| 7,267,471 | B2 * | 9/2007 | Torihara | 362/625 |
| 7,471,354 | B2 * | 12/2008 | Chen | 349/65 |

FOREIGN PATENT DOCUMENTS

JP  2005276753 A  10/2005

* cited by examiner

*Primary Examiner* — Ali Alavi
(74) *Attorney, Agent, or Firm* — Morris Manning & Martin LLP; Tim Tingkang Xia, Esq.

(57) ABSTRACT

A backlight module includes a reflector, a light-guiding sheet, a light-emitting element, and a plurality of first adhesive materials. The reflector has a reflecting surface and the light-guiding sheet is disposed on the reflecting surface. The light-emitting element is disposed on the reflecting surface and located beside the light-guiding sheet. The first adhesive materials are disposed between the reflecting surface and the light-guiding sheet, and adhere the reflecting surface, the light-guiding sheet, and the light-emitting element.

24 Claims, 7 Drawing Sheets

BACKGROUND OF THE INVENTION

1. Field of Invention

The present invention relates to a light source module, and more particularly to a backlight module.

2. Related Art

With the rapid development of the photoelectric industry, liquid crystal display has been widely used in various electrical products. A liquid crystal display needs to display images by using a planar light source provided by a backlight module. Therefore, the backlight module is an indispensable element for the liquid crystal display.

Figure 1A:
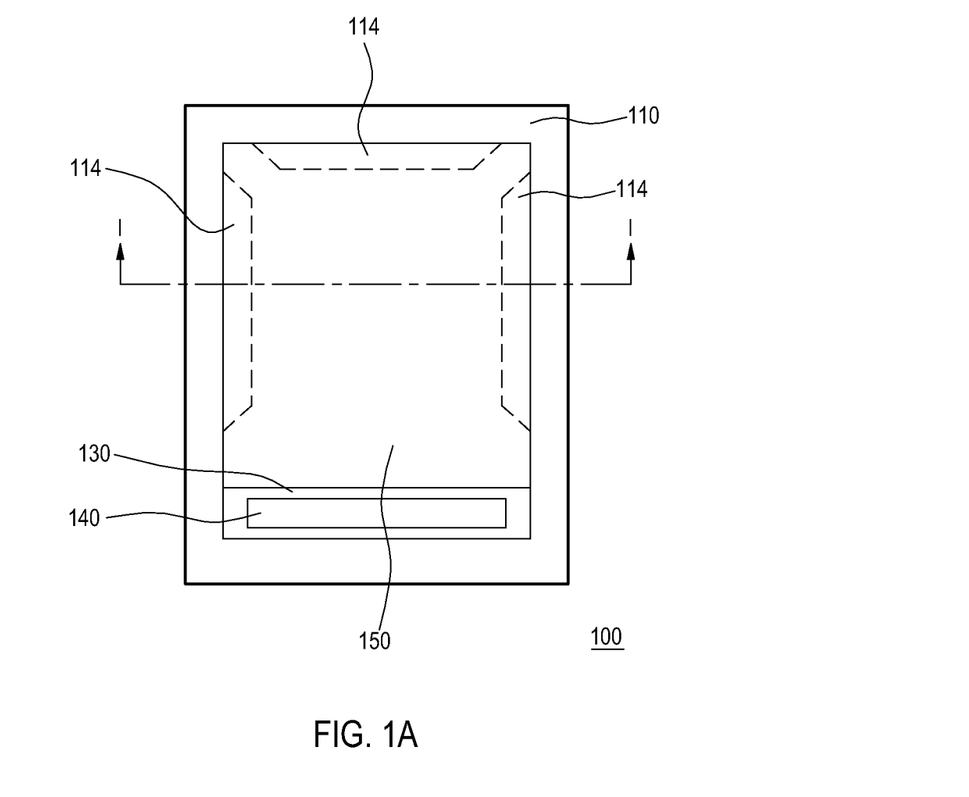
FIG. 1A is a top view of a backlight module in the prior art.
Figure 1B:
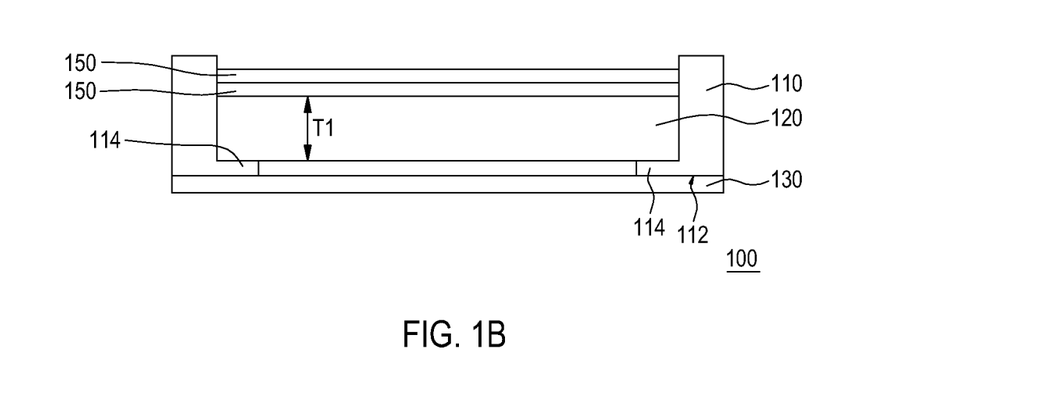
FIG. 1B is a cross-sectional view taken along Line I-I of FIG. 1A.

FIG. 1A is a top view of a backlight module in the prior art, and FIG. 1B is a cross-sectional view taken along Line I-I of FIG. 1A. Referring to FIGS. 1A and 1B, a backlight module 100 in the prior art includes a plastic mold 110, a light-guiding plate 120, a reflecting plate 130, a cold cathode fluorescent lamp 140, and a plurality of optical films 150. The light-guiding plate 120, the cold cathode fluorescent lamp 140, and the optical films 150 are all disposed within the plastic mold 110. The reflecting plate 130 is adhered to a lower plane 112 of the plastic mold 110 by a double-sided adhesive tape (not shown in both FIGS. 1A and 1B).

A thickness T1 of the light-guiding plate 120 is generally greater than 0.5 cm, and the light-guiding plate 120 is rigid and not readily deformable. The plastic mold 110 has a plurality of flanges 114, and the light-guiding plate 120 is disposed on the flanges 114. As the light-guiding plate 120 is rigid, the light-guiding plate 120 can be stably placed on the flanges 114, and does not easily fall off from the lower plane 112.

When the light-guiding plate 120 is disposed within the plastic mold 110 and placed on the flanges 114, the rigid light-guiding plate 120 is supported by the flanges 114 to bear the optical films 150. As such, the optical films 150 can be stacked on the light-guiding plate 120, and the optical films 150 and the light-guiding plate 120 can be disposed on the flanges 114 of the plastic mold 110.

In the current photoelectric industry, the backlight module 100 is generally assembled manually. In particular, in the process of assembling the backlight module 100, both the method for disposing the light-guiding plate 120, the cold cathode fluorescent lamp 140, and the optical films 150 within the plastic mold 110, and the method for adhering the reflecting plate 130 to the lower plane 112 are performed manually by operators, rather than automatically by mechanical means.

SUMMARY OF THE INVENTION

The present invention provides a backlight module, which is capable of providing a planar light source.

The present invention provides a backlight module which includes a reflector, a light-guiding sheet, a light-emitting element, and a plurality of first adhesive materials. The reflector has a reflecting surface, and the light-guiding sheet is disposed on the reflecting surface. The light-emitting element is disposed on the reflecting surface and located beside the light-guiding sheet, and the plurality of first adhesive materials is disposed between the reflecting surface and the light-guiding sheet and adhering the reflecting surface, the light-guiding sheet, and the light-emitting element.

In one embodiment, a thickness of the light-guiding sheet is between 0.02 cm and 0.5 cm.

In one embodiment, the first adhesive materials partially cover the reflecting surface.

In one embodiment, at least one of the first adhesive materials is a double-sided adhesive tape or an adhesive.

In one embodiment, the adhesive is an ultraviolet curing adhesive or a thermal curing adhesive.

In one embodiment, a planarization layer disposed on the light-emitting element is further included.

In one embodiment, the light-emitting element has an upper surface and a lower surface opposite to the upper surface, the planarization layer covers the upper surface, and at least one of the first adhesive materials is adhered to the lower surface.

In one embodiment, the planarization layer is a double-sided adhesive tape or an adhesive.

In one embodiment, the adhesive is an ultraviolet curing adhesive or a thermal curing adhesive.

In one embodiment, a pair of conveying strips are further included, wherein the reflector is connected between the conveying strips, and a cutting line is formed between each of the conveying strips and the reflector.

In one embodiment, each of the conveying strips has a plurality of positioning holes, and the positioning holes are arranged along the cutting lines respectively.

In one embodiment, the reflector is a white plastic sheet or a metal sheet.

In one embodiment, the reflector includes a substrate and a reflective layer disposed on the substrate, and the reflective layer is located between the light-guiding sheet and the substrate.

In one embodiment, a reflective material is further included, wherein the light-guiding sheet has a light-emitting surface, a bottom surface opposite to the light-emitting surface, a side surface connected between the light-emitting surface and the bottom surface, the first adhesive materials are adhered between the reflecting surface and the bottom surface, and the reflective material covers the side surface.

In one embodiment, the side surface includes a light-incident surface, the light-emitting element is disposed beside the light-incident surface, and the reflective material does not cover the light-incident surface.

In one embodiment, the reflective material is a silica gel material, a reflective adhesive tape, or a polycarbonate (PC) material.

In one embodiment, the light-emitting element includes a circuit board and at least one light-emitting diode assembled on the circuit board.

In one embodiment, at lease one optical film and at least one second adhesive material is further included, wherein the second adhesive material is adhered between the optical film and the light-guiding sheet, and the light-guiding sheet is located between the optical film and the reflector.

In one embodiment, the second adhesive material is a double-sided adhesive tape or an adhesive.

In one embodiment, the adhesive is an ultraviolet curing adhesive or a thermal curing adhesive.

In one embodiment, at least one third adhesive material and a plurality of optical films are further included, wherein the third adhesive material is adhered between the optical films.

In one embodiment, the third adhesive material is a double-sided adhesive tape or an adhesive.

In one embodiment, the adhesive is an ultraviolet curing adhesive or a thermal curing adhesive.

In one embodiment, a light-shielding layer is further included, wherein the light-guiding sheet is disposed between the light-shielding layer and the reflector.

In the present invention, through the use of adhesive materials (for example, first adhesive materials), a plurality of elements (such as a light-guiding sheet and a light-emitting element) of the backlight module can be disposed on a reflector by adhesion. In such a manner, no plastic mold needs to be disposed in the present invention, thereby saving the cost of the plastic mold and reducing the volume of the backlight module.

In order to make the above features and advantages of the present invention more comprehensible, embodiments accompanied with figures are described in detail below.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2A:
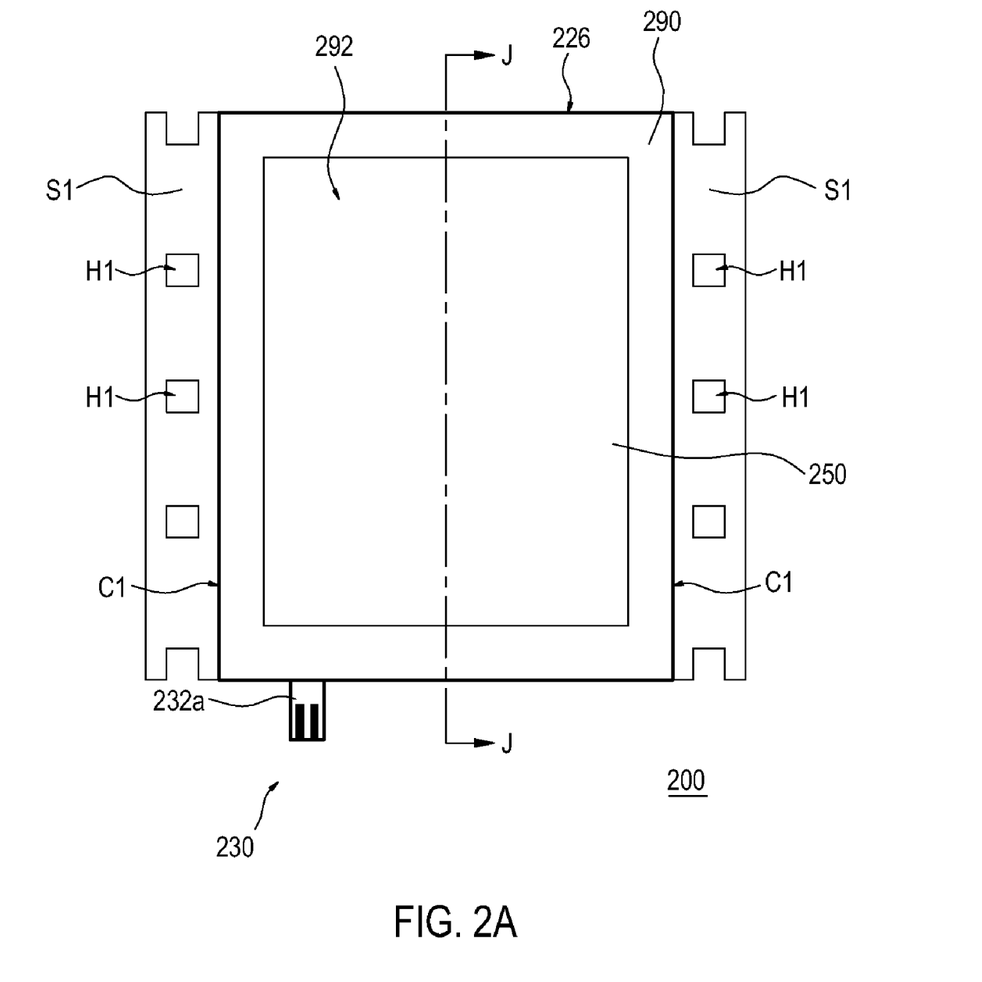
FIG. 2A is a top view of a backlight module according to an embodiment of the present invention.
Figure 2B:
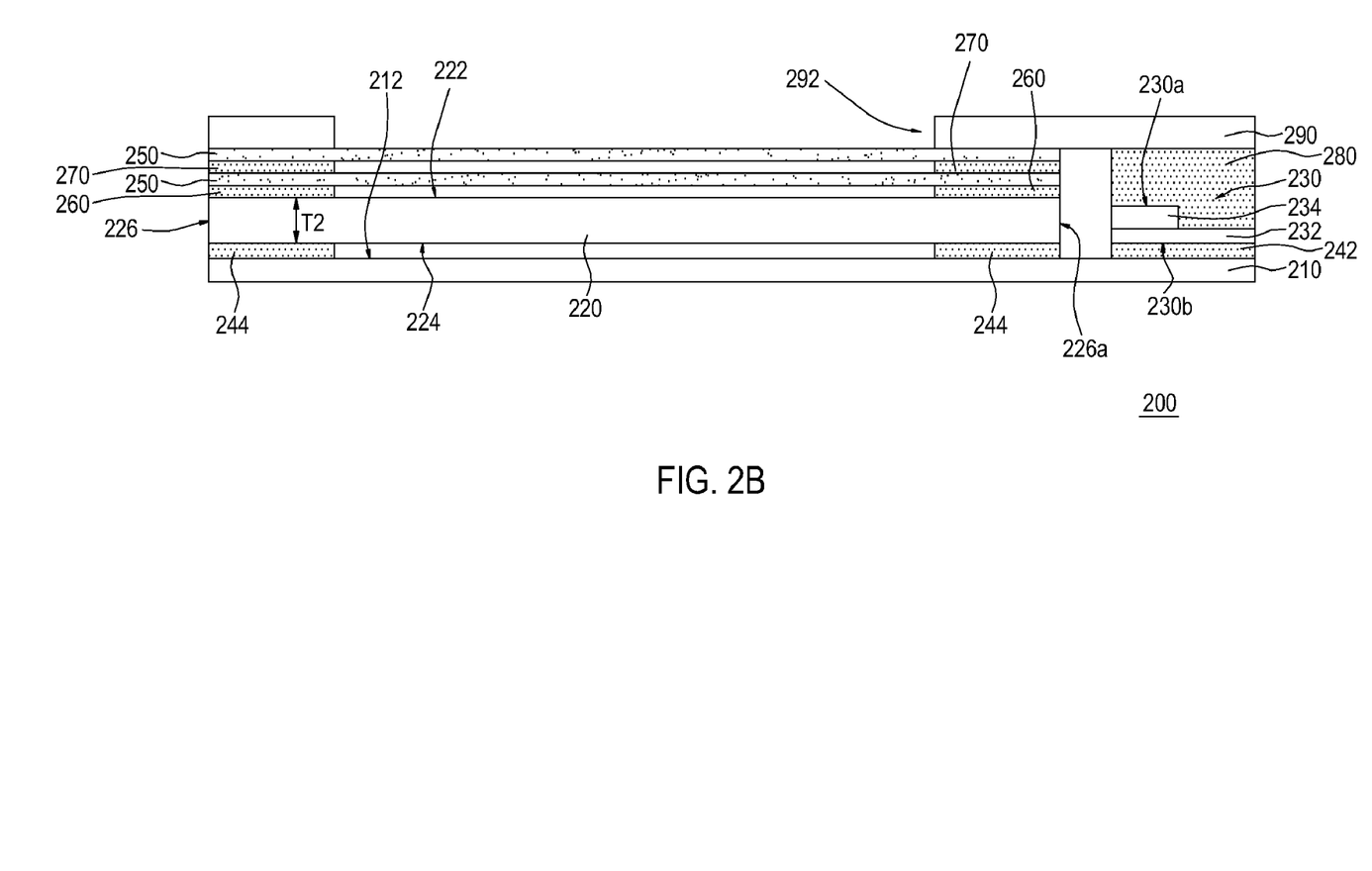
FIG. 2B is a cross-sectional view taken along Line J-J of FIG. 2A.

FIG. 2A is a top view of a backlight module according to an embodiment of the present invention, and FIG. 2B is a cross-sectional view taken along Line J-J of FIG. 2A. Referring to FIGS. 2A and 2B, the backlight module 200 may not only be disposed in a liquid crystal display to provide a planar light source required by the liquid crystal display, but may also be disposed in a light-emitting billboard to serve as a light source of the billboard. Therefore, the backlight module 200 may not only be applied in the technical field of liquid crystal displays, but may also be applied in the technical field of lighting devices such as light-emitting billboards.

The backlight module 200 includes a reflector 210, a light-guiding sheet 220, a light-emitting element 230, and a plurality of first adhesive materials 242, 244. The reflector 210 has a reflecting surface 212, and the light-guiding sheet 220, the light-emitting element 230 and the first adhesive materials 242, 244 are all disposed on the reflecting surface 212.

The first adhesive materials 242, 244 are disposed between the reflecting surface 212 and the light-guiding sheet 220, and adhere the reflecting surface 212, the light-guiding sheet 220, and the light-emitting element 230. In particular, the first adhesive material 242 are adhered between the reflecting surface 212 and the light-emitting element 230, and the first adhesive materials 244 are adhered between the reflecting surface 212 and the light-guiding sheet 220. Therefore, the light-guiding sheet 220 and the light-emitting element 230 are adhered to the reflecting surface 212 by the first adhesive materials 242, 244.

In this embodiment, the first adhesive materials 242, 244 partially cover the reflecting surface 212. In other embodiments not shown, the first adhesive materials 242, 244 may completely cover the reflecting surface 212. In addition, the first adhesive materials 242, 244 may be double-sided adhesive tapes or adhesives. The adhesives may be liquid glues, or thick paste-like glue materials. Moreover, the adhesives may be ultraviolet curing adhesives or thermal curing adhesives.

As discussed above, the first adhesive materials 242, 244 may be totally the same, different, or partially the same. For example, all the first adhesive materials 242, 244 may be double-sided adhesive tapes or adhesives of the same material. Alternatively, the first adhesive material 242 is a double-sided adhesive tape, and the first adhesive materials 244 are adhesives of the same material or different materials. For example, all the first adhesive materials 244 are ultraviolet curing adhesives. Alternatively, one first adhesive material 244 is an ultraviolet curing adhesive, and another first adhesive material 244 is a thermal curing adhesive.

The light-guiding sheet 220 has a light-emitting surface 222, a bottom surface 224, and a side surface 226. The bottom surface 224 is opposite to the light-emitting surface 222. The side surface 226 is connected between the light-emitting surface 222 and the bottom surface 224, and includes a light-incident surface 226a. The first adhesive materials 242, 244 are adhered between the reflecting surface 212 and the bottom surface 224. The light-emitting element 230 is located beside the light-guiding sheet 220, and disposed beside the light-incident surface 226a. The light-emitting element 230 is capable of emitting light towards the light-incident surface 226a of the light-guiding sheet 220.

When a plurality of light rays emitted from the light-emitting element 230 enters the light-guiding sheet 220 through the light-incident surface 226a, the light rays within the light-guiding sheet 220 are reflected and scattered, such that a large part of the light rays are emitted from the light-emitting surface 222. That is to say, the light-guiding sheet 220 can basically guide the light rays emitted from the light-emitting element 230 to the light-emitting surface 222 for emission.

The light-guiding sheet 220 may be made of a polymeric material such as polymethylmethacrylate (PMMA, also referred to as acrylic), polyethylene terephthalate (PET) or polyimide (PI). A thickness T2 of the light-guiding sheet 220 may be greater than 0.5 cm, that is, the light-guiding sheet 220 may a conventional light-guiding plate (for example, the light-guiding plate 120 as shown in FIG. 1B). In addition, the thickness T2 of the light-guiding sheet 220 may also be between 0.02 cm and 0.5 cm, and the light-guiding sheet 220 may also be a flexible and readily deformable optical film.

The backlight module 200 may further include a plurality of optical films 250, one or more second adhesive materials 260, and one or more third adhesive materials 270. The optical films 250 may be a brightness enhancement film and a diffuser respectively, and a position sequence of the brightness enhancement film and the diffuser relative to the light-guiding sheet 220 is not limited. For example, the brightness enhancement film is disposed between the light-guiding sheet 220 and the diffuser, or the diffuser is disposed between the light-guiding sheet 220 and the brightness enhancement film.

The second adhesive materials 260 are adhered between one optical film 250 and the light-guiding sheet 220, and the third adhesive materials 270 are adhered between the optical films 250. The light-guiding sheet 220 may be located between the optical films 250 and the reflector 210. The second adhesive materials 260 and the third adhesive materials 270 may be of the same material as the first adhesive materials 242, 244. That is to say, both the second adhesive materials 260 and the third adhesive materials 270 are double-sided adhesive tapes or adhesives, and the adhesives may be ultraviolet curing adhesives or thermal curing adhesives.

It should be noted that, in other embodiment that not shown, the backlight module 200 does not include the optical films 250. In particular, the optical films 250 and the light-guiding sheet 220 may be integrated. That is to say, the light-guiding sheet 220 not only has a function of guiding light rays, but is also capable of enabling the light rays to be uniformly emitted from the light-emitting surface 222, such that the backlight module 200 can provide a planar light source with uniform brightness distribution. Accordingly, the backlight module 200 further does not need the second adhesive materials 260 and third adhesive materials 270 used for adhering the optical films 250.

Secondly, all the optical films 250 may be integrated. For example, the brightness enhancement film and the diffuser may be integrated into one optical film 250. Therefore, the backlight module 200 may include only one optical film 250. That is to say, the number of the optical film 250 included in the backlight module 200 may be only one. Accordingly, the backlight module 200 does not need the third adhesive materials 270 used for adhering the optical films 250 together.

The light-emitting element 230 has an upper surface 230a and a lower surface 230b opposite to the upper surface 230a. The first adhesive material 242 is adhered to the lower surface 230b. The light-emitting element 230 includes a circuit board 232 and at least one light-emitting diode 234 assembled on the circuit board 232. The light-emitting diode 234 protrudes from a surface of the circuit board 232. The circuit board 232 may be a flexible circuit board and may have a terminal 232a, and the terminal 232a is configured to be connected to an external power supply, so as to enable the light-emitting diode 234 to emit light.

The backlight module 200 may further include a planarization layer 280. The planarization layer 280 is disposed on the light-emitting element 230 and covers the upper surface 230a. As the light-emitting diode 234 protrudes from the surface of the circuit board 232, the upper surface 230a is an uneven surface. The planarization layer 280 completely covers the upper surface 230a, so as to fill recesses on the upper surface 230a, such that the backlight module 200 presents a relatively flat surface in appearance. In addition, the planarization layer 280 may be of the same material as the first adhesive materials 242, 244. Therefore, the planarization layer 280 may be a double-sided adhesive tape or an adhesive, and the adhesive may be an ultraviolet curing adhesive or a thermal curing adhesive.

The backlight module 200 may further include a light-shielding layer 290. The light-guiding sheet 220 is disposed between the light-shielding layer 290 and the reflector 210. In particular, the light-shielding layer 290 may be disposed on the planarization layer 280 and the optical films 250, and may completely cover the planarization layer 280 and partially cover one of the optical films 250. The light-shielding layer 290 has an opening 292 for exposing the optical film 250.

The light-shielding layer 290 may be a black matrix adhesive tape, for example, a double-sided adhesive tape, in which two opposite surfaces of the double-sided adhesive tape are black and white respectively, the black surface is exposed at an outer surface of the backlight module 200, and the white surface is adhered to the optical film 250 and the planarization layer 280, so as to reflect a part of light rays within the backlight module 200, thereby reducing light leakage.

The reflector 210 may be a single-layer structure as shown in FIG. 2B, and may be a white plastic sheet or a metal sheet. The reflector 210 is capable of reflecting light rays emitted from the bottom surface 224. For example, the white plastic sheet is a polymeric substrate doped with a resin material or a white pigment, and the polymeric substrate may be made of a polymeric material such as PMMA, PET or PI.

Figure 2C:
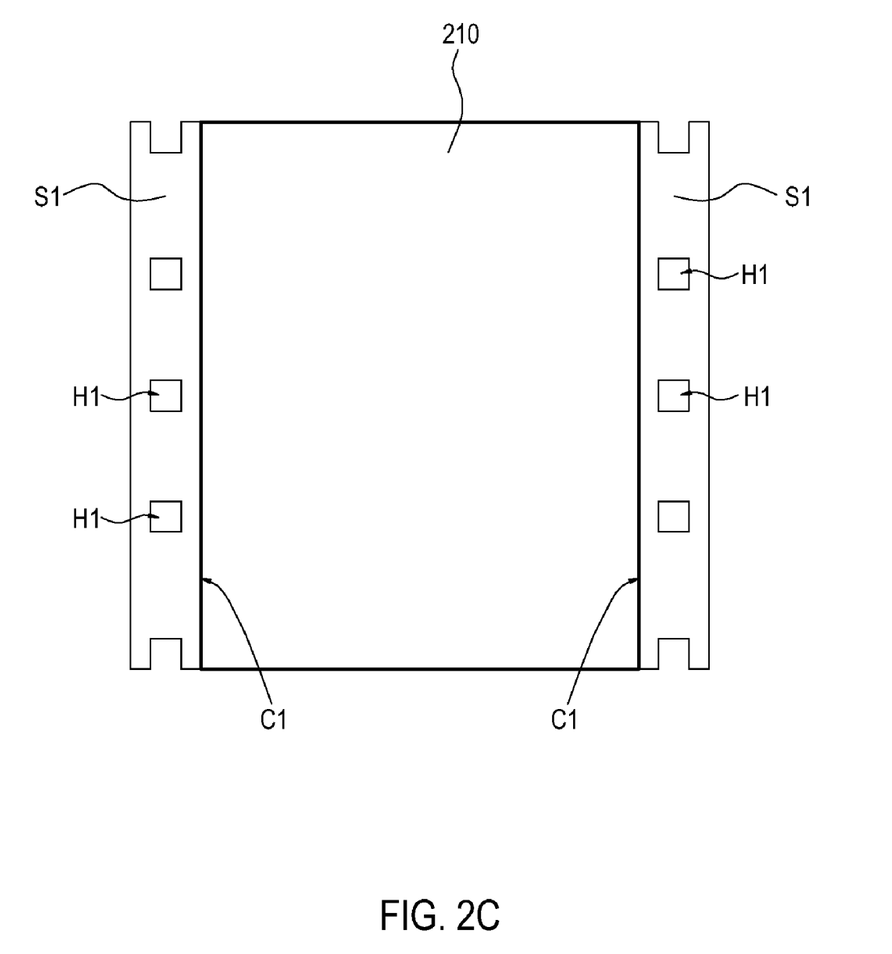
FIG. 2C is a top view of the reflector in FIG. 2A.

FIG. 2C is a top view of the reflector in FIG. 2A. Referring to FIGS. 2A and 2C, in the process of assembling the backlight module 200, the backlight module 200 may further include a pair of conveying strips S1, and the reflector 210 is connected between the conveying strips S1. Each of the conveying strips S1 has a plurality of positioning holes H1. A cutting line C1 may be formed between each of the conveying strips S1 and the reflector 210.

As discussed above, the positioning holes H1 are arranged along the cutting lines C1 respectively, for example, as shown in FIGS. 2A and 2C. For example, the cutting lines C1 are notches or grooves. Through the cutting lines C1, the conveying strips S1 may be easily torn off by hand. In such a manner, the conveying strips S1 can be easily removed from the reflector 210.

The positioning holes H1 of each of the conveying strips S1 are configured to be engaged with a gear (not shown). When the gear rotates, the conveying strips S1 move, thereby driving the reflector 210 to move. By controlling the number of revolutions of the gear, the reflector 210 may be further moved to a predetermined position, so as to facilitate the assembly of the backlight module 200.

In particular, the light-guiding sheet 220, the light-emitting element 230, the optical films 250, the planarization layer 280, and the light-shielding layer 290 are all disposed on the reflector 210 by adhesion, thereby completing the assembly of the backlight module 200. Therefore, the backlight module 200 can be automatically assembled by using a mechanical lamination method, thereby enabling mass production. The mechanical lamination method may be implemented using a laminator used in an adhesive tape factory nowadays.

Secondly, as the reflector 210 can be moved to a predetermined position by controlling the number of revolutions of the gear, the backlight module 200 can be assembled by using a laminator with a winding function. The conveying strips 51 not only have the function of conveying the reflector 210, but also have positioning and aligning functions, such that the laminator can adhere the light-guiding sheet 220, the light-emitting element 230, the optical films 250, the planarization layer 280, and the light-shielding layer 290 at correct positions.

Figure 3:
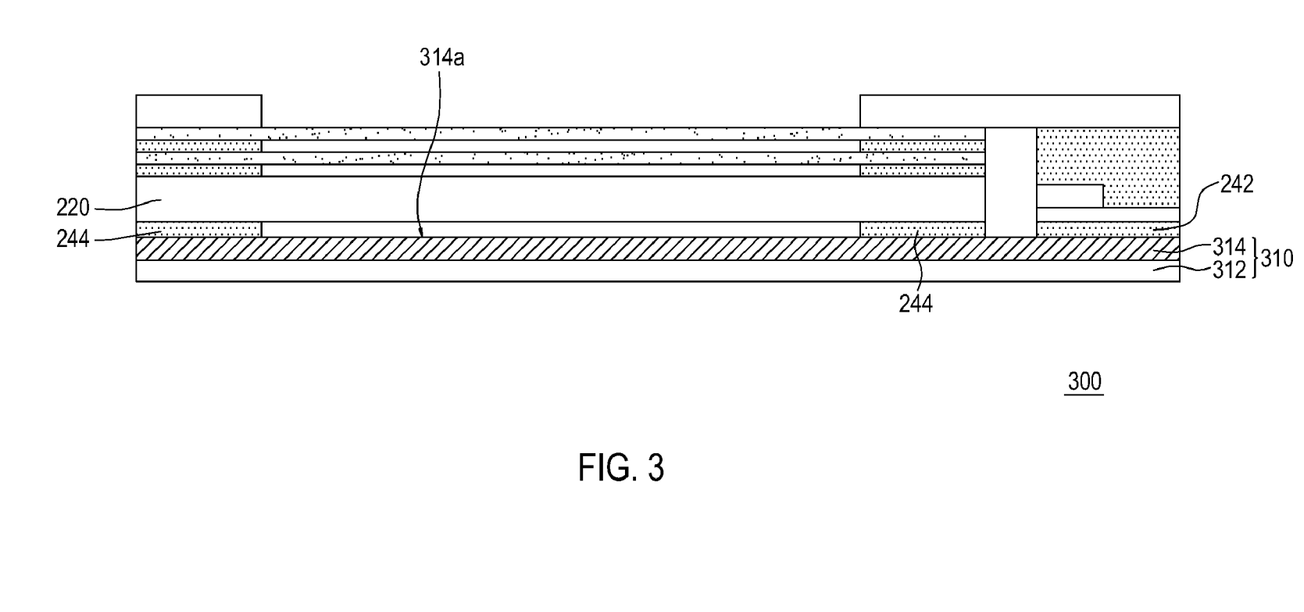
FIG. 3 is a cross-sectional view of a backlight module according to another embodiment of the present invention.

FIG. 3 is a cross-sectional view of a backlight module according to another embodiment of the present invention. Referring to FIG. 3, the backlight module 300 in this embodiment is similar to the backlight module 200 in the above embodiment, except that the backlight module 300 in this embodiment includes a reflector 310 having a structure different from that of the reflector 210 in the above embodiment.

The reflector 210 in the above embodiment is a single-layer structure (referring to FIG. 2B), but the reflector 310 in this embodiment is a multi-layer structure. In particular, the reflector 310 includes a substrate 312 and a reflective layer 314 disposed on the substrate 312. The reflective layer 314 is located between the light-guiding sheet 220 and the substrate 312, and has a reflecting surface 314a. The first adhesive materials 242, 244 are adhered to the reflecting surface 314a.

As discussed above, the substrate 312 may be made of a polymeric material such as PMMA, PET or PI, and the reflective layer 314 may be a metal layer or a white pigment layer. When the reflective layer 314 is the metal layer, the reflective layer 314 can be formed by sputtering, metal spraying, metal sheet lamination, or other methods. In addition, the function of the reflector 310 is the same as that of the reflector 210 in the above embodiment, so the details will not be described herein again.

Figure 4A:
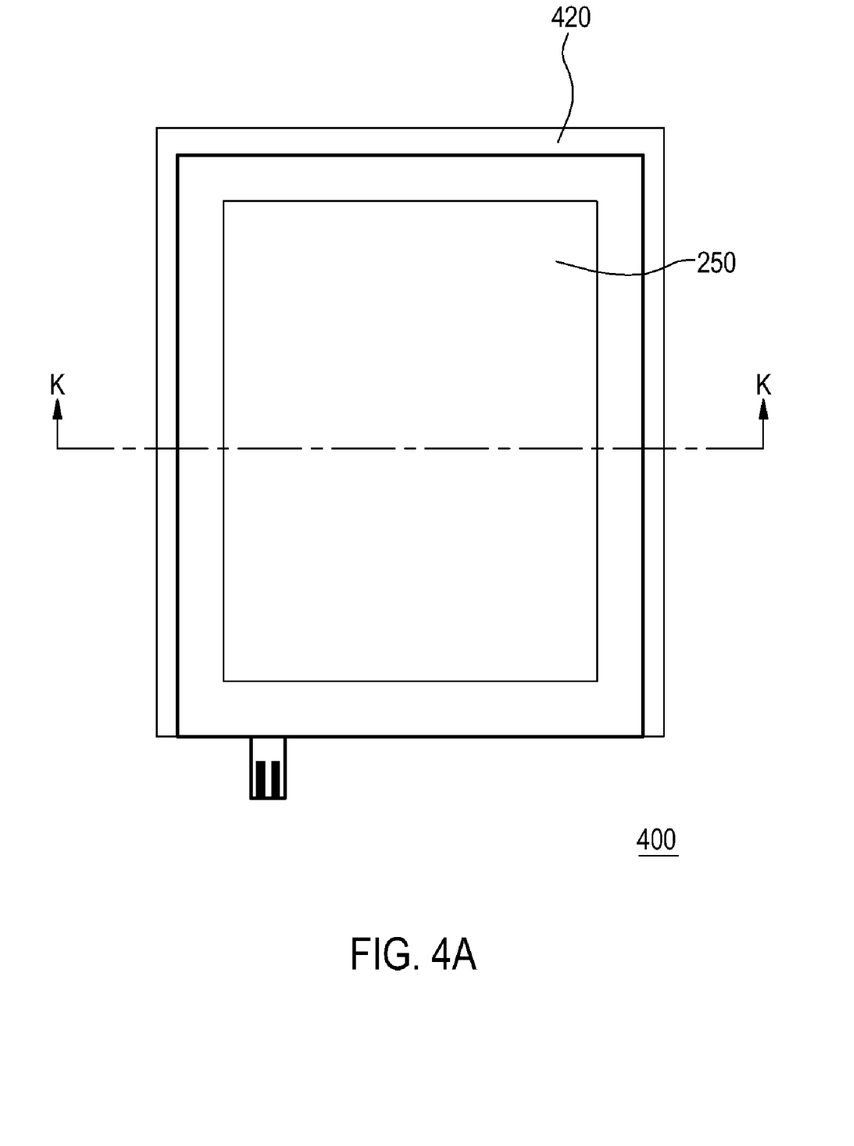
FIG. 4A is a top view of a backlight module according to another embodiment of the present invention.
Figure 4B:
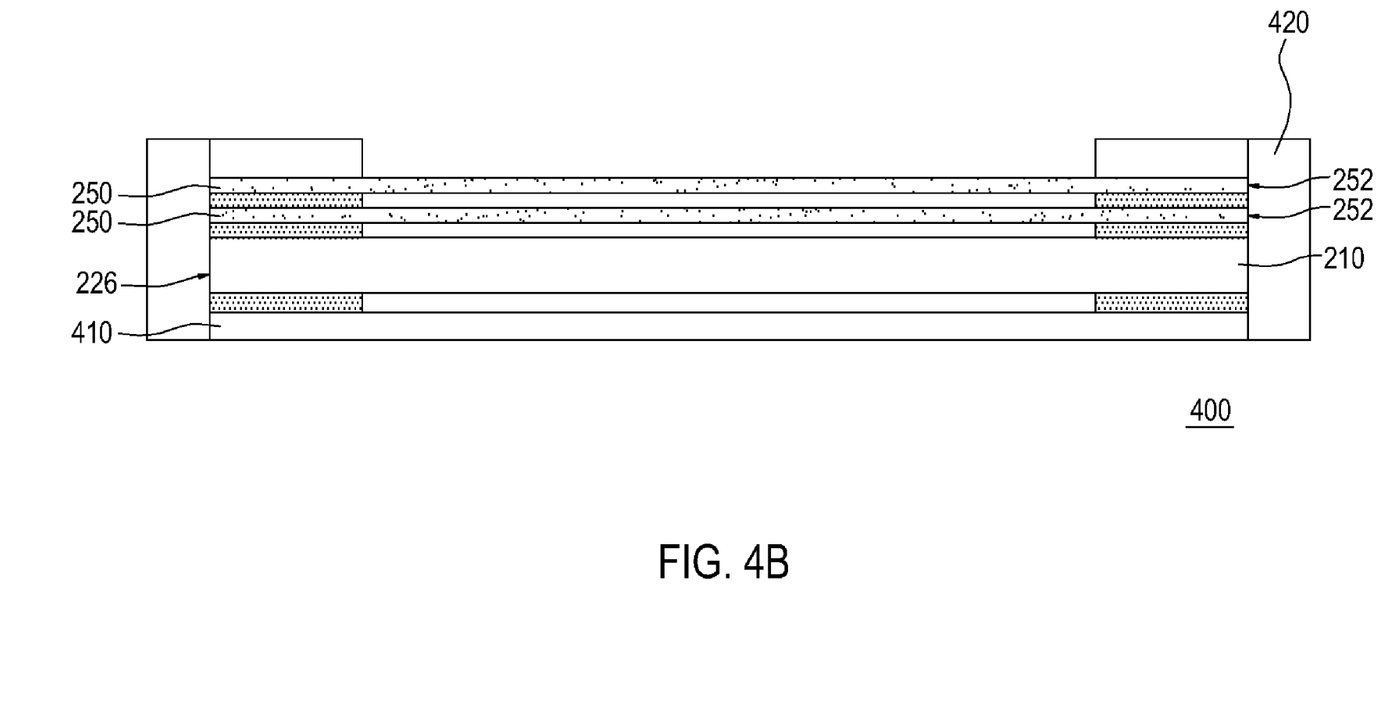
FIG. 4B is a cross-sectional view taken along Line K-K of FIG. 4A.

FIG. 4A is a top view of a backlight module according to another embodiment of the present invention, and FIG. 4B is a cross-sectional view taken along Line K-K of FIG. 4A. Referring to FIGS. 4A and 4B, the backlight module 400 in this embodiment is similar to the backlight module 200 in the above embodiment, except that the backlight module 200 includes a pair of conveying strips S1 (referring to FIG. 2A), but the backlight module 400 does not include any conveying strip S1 and further includes a reflective material 420.

In particular, the backlight module 400 includes a light-guiding sheet 210, a plurality of optical films 250, a reflector 410, and a reflective material 420. The reflective material 420 covers a side surface 226 of the light-guiding sheet 220, and may further cover side surfaces 252 of the optical films 250. The reflective material 420 has a function of reflecting light rays. Therefore, the reflective material 420 can reflect a part of light rays within the backlight module 200, thereby reducing light leakage. In addition, in this embodiment, the reflective material 420 may be a silica gel material, a reflective adhesive tape or a polycarbonate (PC) material.

It should be noted that, the reflector 410 of the backlight module 400 may be the reflector 210 (referring to FIG. 2B) or the reflector 310 (referring to FIG. 3) in the above embodiments. That is to say, the reflector 410 may be a white plastic sheet or a metal sheet, or the reflector 410 may also include a substrate and a reflective layer disposed on the substrate.

To sum up, through the use of the adhesive materials (for example, the first, second, and third adhesive materials), a plurality of elements (such as the light-guiding sheet and the light-emitting element) of the backlight module can be disposed on the reflector by adhesion. Therefore, for the backlight module of the present invention, the assembly of elements such as the light-guiding sheet, the reflector, and the light-emitting element can be accomplished without using any plastic mold. It can be seen that, no plastic mold needs to be disposed in the present invention, thereby saving the cost of the plastic mold and reducing the volume of the backlight module.

Secondly, as the plurality of elements of the backlight module can be disposed on the reflector by adhesion, the backlight module of the present invention can be automatically assembled by using the mechanical lamination method. Compared to the manual assembly of the backlight module in the prior art, the backlight module of the present invention has advantages of fast assembly and being suitable for mass production.

Moreover, as the backlight module in the prior art needs to use the plastic mold to dispose the light-guiding plate and the optical films, and the light-guiding plate must be stably placed on the flanges of the plastic mold in order to bear the optical films, the backlight module in the prior art must use a rigid light-guiding plate having a thickness greater than 0.5 cm, and cannot use a flexible and readily deformable optical film having a thickness between 0.02 cm and 0.5 cm as the light-guiding plate. Otherwise, the light-guiding plate easily slides off from the plastic mold due to excessive flexibility, and is difficult to be disposed within the plastic mold.

However, as the backlight module of the present invention can be assembled by adhesion, and can be further assembled by the mechanical lamination method, the backlight module of the present invention can use both a rigid light-guiding plate having a thickness greater than 0.5 cm and a flexible and readily deformable light-guiding sheet having a thickness between 0.02 cm and 0.5 cm. Compared with the prior art, the backlight module of the present invention is characterized by small volume and thickness, and thus follows the miniaturization trend of electronic devices such as mobile phones and notebook computers.

Although the present invention is disclosed through the above embodiments, the embodiments are not intended to limit the present invention. Equivalent replacements like variations and modifications made by any person skilled in the similar art without departing from the spirit and scope of the present invention shall still fall within the protection scope of the present invention.

What is claimed is:

1. A backlight module, comprising:
    a reflector, having a reflecting surface;
    a light-guiding sheet, disposed on the reflecting surface;
    a light-emitting element, disposed on the reflecting surface and located beside the light-guiding sheet; and
    a plurality of first adhesive materials, disposed between the reflecting surface and the light-guiding sheet, and adhering the reflecting surface, the light-guiding sheet, and the light-emitting element.

2. The backlight module according to claim 1, wherein a thickness of the light-guiding sheet is between 0.02 cm and 0.5 cm.

3. The backlight module according to claim 1, wherein the first adhesive materials partially cover the reflecting surface.

4. The backlight module according to claim 1, wherein at least one of the first adhesive materials is a double-sided adhesive tape or an adhesive.

5. The backlight module according to claim 4, wherein the adhesive is an ultraviolet curing adhesive or a thermal curing adhesive.

6. The backlight module according to claim 1, further comprising a planarization layer disposed on the light-emitting element.

7. The backlight module according to claim 6, wherein the light-emitting element has an upper surface and a lower surface opposite to the upper surface, the planarization layer covers the upper surface, and at least one of the first adhesive materials is adhered to the lower surface.

8. The backlight module according to claim 6, wherein the planarization layer is a double-sided adhesive tape or an adhesive.

9. The backlight module according to claim 8, wherein the adhesive is an ultraviolet curing adhesive or a thermal curing adhesive.

10. The backlight module according to claim 1, further comprising a pair of conveying strips, wherein the reflector is connected between the conveying strips, and a cutting line is formed between each of the conveying strips and the reflector.

11. The backlight module according to claim 10, wherein each of the conveying strips has a plurality of positioning holes, and the positioning holes are arranged along the cutting lines respectively.

12. The backlight module according to claim 1, wherein the reflector is a white plastic sheet or a metal sheet.

13. The backlight module according to claim 1, wherein the reflector comprises a substrate and a reflective layer disposed on the substrate, and the reflective layer is located between the light-guiding sheet and the substrate.

14. The backlight module according to claim 1, further comprising a reflective material, wherein the light-guiding sheet has a light-emitting surface, a bottom surface opposite to the light-emitting surface, a side surface connected between the light-emitting surface and the bottom surface, the first adhesive materials are adhered between the reflecting surface and the bottom surface, and the reflective material covers the side surface.

15. The backlight module according to claim 14, wherein the side surface comprises a light-incident surface, the light-emitting element is disposed beside the light-incident surface, and the reflective material does not cover the light-incident surface.

16. The backlight module according to claim 14, wherein the reflective material is a silica gel material, a reflective adhesive tape, or a polycarbonate (PC) material.

17. The backlight module according to claim 1, wherein the light-emitting element comprises a circuit board and at least one light-emitting diode assembled on the circuit board.

18. The backlight module according to claim 1, further comprising at lease one optical film and at least one second adhesive material, wherein the second adhesive material is adhered between the optical film and the light-guiding sheet, and the light-guiding sheet is located between the optical film and the reflector.

19. The backlight module according to claim 18, wherein the second adhesive material is a double-sided adhesive tape or an adhesive.

20. The backlight module according to claim 19, wherein the adhesive is an ultraviolet curing adhesive or a thermal curing adhesive.

21. The backlight module according to claim 18, further comprising at least one third adhesive material and a plurality of optical films, wherein the third adhesive material is adhered between the optical films.

22. The backlight module according to claim 21, wherein the third adhesive material is a double-sided adhesive tape or an adhesive.

23. The backlight module according to claim 22, wherein the adhesive is an ultraviolet curing adhesive or a thermal curing adhesive.

24. The backlight module according to claim 1, further comprising a light-shielding layer, wherein the light-guiding sheet is disposed between the light-shielding layer and the reflector.

* * * * *